United States Patent
Woollen

(10) Patent No.: US 6,648,285 B1
(45) Date of Patent: Nov. 18, 2003

(54) SUCTION CUP WITH HOLD/RELEASE MECHANISM

(76) Inventor: Jeffrey K. Woollen, 17115 Vashon Hwy. SW., Vashon, WA (US) 98070

( * ) Notice: Subject to any disclaimer, the term of this patent is extended or adjusted under 35 U.S.C. 154(b) by 0 days.

(21) Appl. No.: 10/223,723

(22) Filed: Aug. 20, 2002

(51) Int. Cl.⁷ .................................................. A47F 5/00
(52) U.S. Cl. ................................ 248/205.8; 248/206.2
(58) Field of Search ......................... 248/205.8, 205.9, 248/205.7, 206.1, 205.5, 206.2, 205.4, 363

(56) References Cited

U.S. PATENT DOCUMENTS

| | | | |
|---|---|---|---|
| 4,846,429 A | 7/1989 | Scheurer et al. | |
| 5,029,786 A | 7/1991 | Wu | |
| 5,087,005 A | 2/1992 | Holoff et al. | |
| 5,133,524 A | 7/1992 | Liu | |
| 5,176,346 A | 1/1993 | Liu | |
| 5,176,357 A * | 1/1993 | Hobart, II | 248/683 |
| 5,381,990 A | 1/1995 | Belokin et al. | |
| 5,405,112 A | 4/1995 | Trethewey | |
| 5,454,540 A | 10/1995 | McPherson et al. | |
| 5,511,752 A | 4/1996 | Trethewey | |
| 5,611,511 A * | 3/1997 | Lee | 248/205.8 |
| 5,651,520 A | 7/1997 | Belokin et al. | |
| 5,711,501 A | 1/1998 | Belokin et al. | |
| 6,143,391 A | 11/2000 | Barnes et al. | |
| 6,308,923 B1 * | 10/2001 | Howard | 248/205.5 |
| 6,318,685 B1 | 11/2001 | Huber | |
| 6,375,143 B1 | 4/2002 | Burns | |
| 6,402,104 B1 * | 6/2002 | Smith | 248/205.5 |

\* cited by examiner

Primary Examiner—Ramon O. Ramirez

(57) ABSTRACT

A suction cup (10) for holding an attached object to a host surface. The suction cup comprises a stem element (12), a cup element (14) and a hold/release element (16). Cup element (14) is elastic and moveable between an inactive position (that is, unattached to a host surface), and an active position (that is, attached to a host surface). Hold/release element (16) comprises a rigid or semi-rigid web spanning from the upper portion of the suction cup's stem element (12) radially outward to the peripheral edge of the cup element (14), and filling in the remaining space between the element (14) and the stem element (12). The hold/release element (16) is positioned such that when cup element (14) is in the active position, element (12) is generally perpendicular to the host surface.

1 Claim, 1 Drawing Sheet

SUCTION CUP WITH HOLD/RELEASE MECHANISM

CROSS-REFERENCE TO RELATED MATERIAL

Not applicable.

BACKGROUND-FIELD OF INVENTION

This invention relates to suction cups, specifically to a suction cup with a mechanism for providing enhanced holding power when a force is applied in one direction, and release of the suction cup when a force is applied in the opposite direction.

BACKGROUND-DESCRIPTION OF PRIOR ART

Suction cups are often used to temporarily attach a variety of objects to host surfaces. When such host surface is vertical, the suction cup must withstand the sheer force exerted upon it by the weight of the object. In most cases, the fail-point of the suction cup occurs when the stem of the suction cup, to which the object is attached, deflects under the weight of the object until it distorts the flange of the cup sufficiently to cause the cup to lose it's suction. Additionally, if the resilience of the cup material is increased to increase suction and provide for more rigidity in the cup in order to resist this distortion, and thus provide greater sheer strength, the release of the suction cup becomes increasingly difficult. Removal is also difficult where the placement of the suction cup on the object, or the size and shape of the object, does not allow access by the user's fingers to the edge of the suction cup to lift it from the surface and release the suction.

Several types of hold and/or release mechanisms for suction cups have been proposed. None of the proposals achieves both functions from a single element. Most involve complex mechanisms with numerous parts, including valves, levers, cams, filaments, or straps. None provide their benefit selectively based on the direction of force applied to the suction cup. A few examples are given below.

U.S. Pat. No. 5,029,786 by Wu is a two-part device comprising a suction cup and a separate frame which attaches to the cup to provide supplemental resilience to the cup outwardly from the host surface in order to provide increased holding power.

U.S. Pat. No. 5,133,524 (parent) and 5,176,346 (continuation in part) by Liu propose a system similar to Wu, with a separate resilient member attached to the suction cup to provide supplemental resilience and increased holding power.

Both Wu and Liu illustrate an important principle: suction, and thus holding power, is increased by applying force to the center of the suction cup outwardly away from the host surface, provided the outer flange of the cup is protected from distortion, and hence failure, under such force. However, both proposals suffer from several deficiencies. Neither provides for a means for conveniently releasing the hold of the suction cup when desired. Both require the manufacture and assembly of two or more separate pieces in order to function.

U.S. Pat. No. 5,087,005 by Holoffet et al. relies again on the principle illustrated by Wu and Liu. It employs a rather complex assembly of parts to provide force to the center of the suction cup outward from the host surface while supporting the stability of the outer flange of the cup. Again, the device requires the manufacture and assembly of two or more parts, and makes no provision for release of the suction cup.

U.S. Pat. No. 6,318,685 B1 by Huber proposes a two-part device comprising a suction cup with a non-releasably attached connecting element. The connecting element includes a flange portion which attaches to the suction cup on its concave face to stabilize the cup from distortion when force is applied to it. Again, this requires the manufacture and assembly of two or more separate parts. No provision for release of the suction cup is offered.

U.S. Pat. No. 6,143,391 by Barnes et al. proposes a one-piece, dual-material suction cup wherein a highly compliant material for adhesion to a host surface lines the concave surface of a suction cup formed of a highly resilient material to provide outward force away from the host surface. The proposal includes a release mechanism in the form of a release tab attached to the rim of the suction cup which must penetrate the mounted object and be manually manipulated by the user to achieve release of the suction cup.

U.S. Pat. No. 5,381,990 5,651,520 and 5,711,501 by Belokin et al. propose a releasable suction cup comprising a suction cup with a valve assembly for selectively closing or opening a bore which passes through the suction cup to allow release of the vacuum. The device requires the manufacture and assembly of two or more parts. No provision for enhanced holding power is included.

U.S. Pat. No. 5,176,357 by Hobart proposes a suction cup with a release mechanism comprising a lever attached to the suction cup for lifting the cup's outer flange from the host surface, thus releasing the vacuum. This mechanism requires that the lever be manually manipulated by the user, and thus requires that the lever either penetrate a portion of the mounted object, or be used only on objects whose size and shape allow for access to the lever. No provision for enhanced holding power is included.

U.S. Pat. No. 5,405,112 by Trethewey proposes a suction cup with a release mechanism comprising a lever and strap arrangement wherein a strap, attached at one end to the outer flange of the suction cup, penetrates the mounted object and attaches at it's other end to a lever which must be manipulated by the user to accomplish release of the vacuum. The device requires the manufacture and assembly of two or more parts. No provision for enhanced holding power is included.

U.S. Pat. No. 5,454,540 by McPherson et al. proposes a suction cup release mechanism comprising a lever pivotally mounted to a support, and a linkage member attached to the outer flange of the suction cup. This mechanism requires that the lever be manually manipulated by the user, and thus requires that either the lever or the linkage member penetrate a portion of the mounted object, or be used only on objects whose size and shape allow for access to the lever. The device requires the manufacture and assembly of two or more parts. No provision for enhanced holding power is included.

U.S. Pat. No. 5,511,752 by Tretheway proposes a suction cup with a release mechanism comprising a valve assembly. The device requires the manufacture and assembly of two or more parts. No provision for enhanced holding power is included.

U.S. Pat. No. 6,375,143 B1 by Burns proposes a suction cup with a release mechanism comprising a tab formed integral with the rim of the suction cup, and a filament attached at one end to the tab. The filament then penetrates the attached object where it can be manipulated by the user to achieve release of the vacuum. The device requires the manufacture and assembly of two or more parts. No provision for enhanced holding power is included.

U.S. Pat. No. 4,846,429 by Scheurer et al. proposes a suction cup with a base assembly, and a release mechanism comprising a slack flexible lever extending between the base assembly and the suction cup. Release is accomplished by rotation of the attached object relative to the host surface, away from the flexible lever until the lever is drawn taught, at which point the lever lifts the rim of the suction cup and releases the vacuum. While this mechanism would work in selected applications where the mounted object can either be rotated relative to the host surface, or is of flexible composition, it would be inoperable when rigid objects were involved which due to size or shape or relation to the host surface did not lend themselves to rotation away from the host surface to affect release. In addition, no provision for enhanced holding power is included.

SUMMARY

The present invention pertains to a suction cup which provides enhanced holding power against force applied in one direction, and release of the suction cup when force is applied in the opposite direction. The mechanism comprises a single element, made integral with the suction cup and thus requires no assembly of parts. The hold/release mechanism comprises a rigid or semi-rigid triangular web spanning from the upper portion of the suction cup's stem radially outward to the rim of the cup, and filling in the remaining space between cup and stem.

When force is applied to the suction cup in the direction towards the hold/release member, (that is, the hold/release member lies on the side of the suction cup furthest from the direction of the force) the member acts as a lever, the fulcrum of which approximates the point where the member meets the outer rim of the cup. This lever action directs the force outward, away from the host surface, providing enhanced suction. At the same time, the presence of the rigid or semi-rigid element against the stem stabilizes the stem against deflection which would normally result in the ultimate distortion of the cup and failure of the vacuum.

When force is applied a direction opposite the hold/release member, the hold/release member again acts as a lever. In this instance, the fulcrum approximates the point where the hold/release member meets the base of the stem. The minutest deflection of the stem, unsupported against force in this direction, causes this lever to transfer and amplify the force and movement to lift the outer rim of the suction cup away from the host surface resulting in release of the cup.

This invention has broad application and is especially useful in instances where the host surface is vertical or nearly vertical, and where the size and/or shape of the mounted object prevent direct access to the suction cup to effect manual release by use of the fingers. In fact, it is anticipated that this technology will allow for applications of suction cups not before possible due to the issue of non-accessibility to accomplish release of the cup.

It is therefore an object of the present invention to provide a suction cup which has enhanced holding power and convenient releasability within a one-piece construction.

Objects and Advantages

Accordingly, several objects and advantages of my invention are:

(a) to provide a suction cup with enhanced holding power, especially in applications on vertical surfaces;

(b) to provide a suction cup which can be easily released without direct manipulation of the cup by the user;

(c) to provide a suction cup whose hold/release features are selectable based on direction of applied force;

(d) to provide a suction cup which is of one-piece construction and requires no assembly of parts;

(e) to provide a suction cup which will work with objects of any size or shape without compromise of the object's integrity;

(f) to provide a suction cup which can be inexpensively produced.

Further objects and advantages of my invention will become apparent from a consideration of the drawings and ensuing description.

DRAWING FIGURES

REFERENCE NUMERALS IN DRAWINGS

| | | | |
|---|---|---|---|
| 10 | suction cup | 12 | stem element |
| 14 | cup element | 16 | hold/release element |
| 18 | cup peripheral edge | 20 | release fulcrum point |
| 22 | hold fulcrum point | 24 | point |

DESCRIPTION

Figure 1:
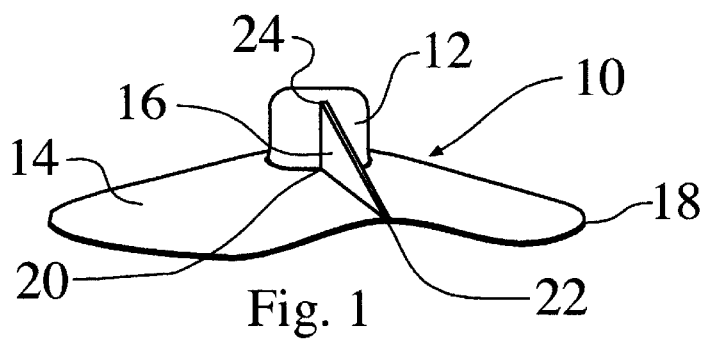
FIG. 1 is a perspective view illustrating the suction cup and the hold/release mechanism in an inactive (that is, unattached to a surface) state.
Figure 2:
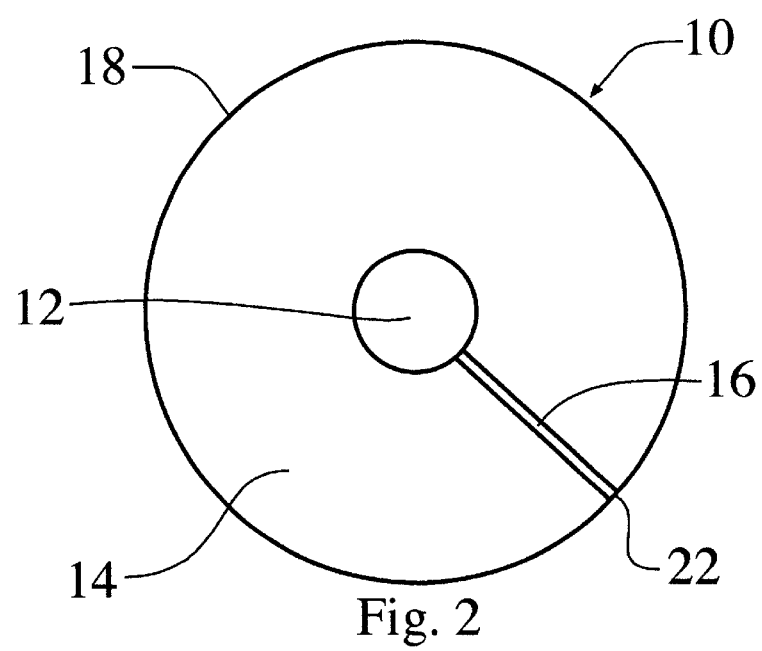
FIG. 2 is a top view of the suction cup and hold/release mechanism.

In the preferred embodiment of the present invention illustrated in FIG. 1, a suction cup, generally indicated at 10, includes a stem element 12, a cup element 14, and a hold/release element 16. Cup element 14 includes a peripheral edge 18. Hold/release element 16 consists of a web of material occupying a generally triangular shaped plane radial to the stem element. The triangular shaped plane being defined by three points 20, 22, 24 align generally perpendicular to the plane of the peripheral edge.

Figure 3:
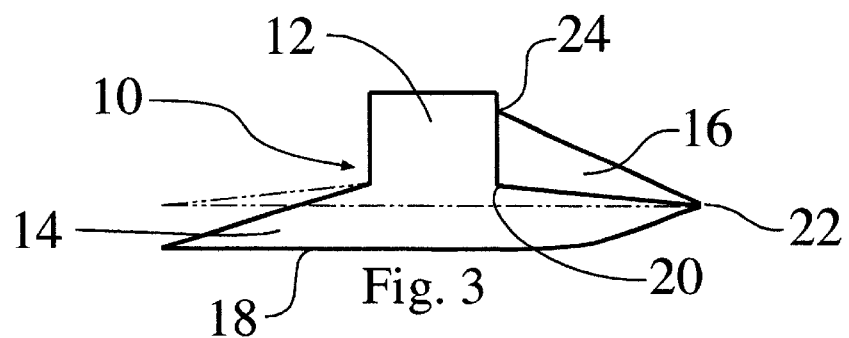
FIG. 3 is a side view of the suction cup and hold/release mechanism in an inactive state, with phantom lines showing the device in an active (that is, attached to a surface) state.

As illustrated in FIG. 3, the cup element is elastic and thus moveable between an inactive position (that is, unattached to a surface) and an active position (that is, attached to a surface). Hold/release element 16 is positioned such that when cup element 14 is in an active state, points 20 and 24 on stem element 12 align generally perpendicular to the plane of peripheral edge 18.

As illustrated in FIG. 1 and FIG. 3, in the inactive state, peripheral edge 18 curves slightly to meet point 22, which is fixed on a line generally perpendicular to a line between points 20 and 24 on stem element 12 by virtue of hold/release element 16.

Operation—Preferred Embodiment

In an active state, force exerted on stem element 12 in the direction of hold/release element 16 is diverted away from the host surface by the lever action of hold release element 16 with point 22 acting as a fulcrum of the lever. The diverted force tends to urge the cup element 14 away from the host surface, resulting in a more secure attachment. At the same time, hold/release element 16 acts to support stem element 12 from deflecting under force, thus protecting cup element 14 from distortion which would ultimately result in a release of suction.

Force exerted on stem element 12 in the direction opposite of the hold/release element 16 is transmitted to point 22 by virtue of the lever action of hold/release element 16 with point 20 acting as a fulcrum of the lever. The transmitted force tends to urge peripheral edge 18 away from the host surface, releasing the cup.

Conclusion, Ramification and Scope of Invention

Thus the reader will see that the suction cup of the invention provides a simple, convenient device which lends itself to a broad array of applications. The extra holding power combined with the simple releasability allow the device to be utilized in situations where conventional suction cups would either fail due to inadequate holding power, or be impractical due to inaccessibility for effecting release of the cup.

While my above description contains many specificities, these should not be construed as limitations on the scope of the invention, but rather as an exemplification of one preferred embodiment thereof. Other variations are possible. For example, an array of such suction cups could be arranged on a flexible backing sheet made integral with the cups, and lined on it's backside with a pressure sensitive adhesive covered with a removable liner. Such an array could be cut to the appropriate size and shape by the user and applied to any size and shape object. The stem of the suction cup can be configured to accommodate any number of attachment techniques Accordingly, the scope of the invention should be determined not by the embodiments illustrated, but by the appended claims and their legal equivalents.

I claim:

1. A suction cup for holding an attached object to a host surface, the suction cup comprising:

(a) a cup element comprising an elastic material and having a peripheral edge (b) a stem element having a first end centrally attached to the cup element and a second end, a hold/release element comprising a web of material occupying a generally triangular shaped plane radial to the stem element, said triangular shaped plane being defined by three points, the first point being a point at or near the second end of the stem element, the second point being a point on or near the peripheral edge of the cup element, and the third point being the point where the stem element and the cup element join, said hold/release element being immovably attached to and/or integral with both the cup element and the stem element such that forces applied to the second end of the stem element are thereby transmitted towards the peripheral edge of the cup element.

\* \* \* \* \*